United States Patent [19]

Hafele

[11] Patent Number: 4,638,650
[45] Date of Patent: Jan. 27, 1987

[54] ROTARY DRIVE LOCK

[76] Inventor: Carl H. Hafele, Bergstrasse 83, 4050 Monchengladbach 1, Fed. Rep. of Germany

[21] Appl. No.: 648,552

[22] Filed: Sep. 10, 1984

[30] Foreign Application Priority Data

Sep. 14, 1983 [DE] Fed. Rep. of Germany ....... 3333061

[51] Int. Cl.⁴ .................... F16K 35/00; F16K 31/44; G05G 5/00
[52] U.S. Cl. ........................................ 70/179; 70/175; 137/385; 251/249.5
[58] Field of Search .................... 70/175, 176, 179; 137/385, 384.8; 251/289, 249, 249.5

[56] References Cited

U.S. PATENT DOCUMENTS

| | | | |
|---|---|---|---|
| Re. 21,113 | 6/1939 | Sproull .......................... | 251/249.5 X |
| 846,257 | 3/1907 | Stratiff ........................... | 137/385 X |
| 2,360,695 | 10/1944 | Linden et al. .................. | 251/249 X |
| 2,844,021 | 7/1958 | Bryant ............................ | 70/175 |
| 2,872,155 | 2/1959 | Hazard ........................... | 251/249 |
| 3,737,604 | 6/1973 | Dietrich et al. ................ | 251/289 X |
| 4,093,180 | 6/1978 | Strabala ......................... | 251/249.5 X |
| 4,471,801 | 9/1984 | Lange ............................. | 70/176 X |
| 4,483,366 | 11/1984 | Labita ............................ | 70/179 X |

Primary Examiner—Gary L. Smith
Assistant Examiner—Shirish Desai
Attorney, Agent, or Firm—Thomas H. Murray

[57] ABSTRACT

An adjustable lock for rotating drives, more particularly pipework fittings such as screwdown valves, gate valves or the like wherein the drive is required to make a number of revolutions. In the adjustable lock, a planetary transmission is provided as a reducing transmission in order to reduce drive rotation to at most one revolution and, therefore, to define a definite locking position.

7 Claims, 3 Drawing Figures

ROTARY DRIVE LOCK

BACKGROUND OF THE INVENTION

This invention relates to an adjustable lock for a rotary drive such as the drive of a screwdown valve or gate valve.

A publication entitled Sempell KB 440 180 DE discloses a lock for a stop valve wherein the extreme axial positions of an axially-movable, screw-threaded ring represent open and closed positions of the valve. A cylinder lock is disposed such that the lock bolt when extended engages the screw-threaded ring and prevents the same from moving axially, so that the valve is locked in one of the extreme positions. A second lock cylinder is located to enable the valve to be locked in the other extreme position such that it may be secured in either its open or closed position, but the lock positions are not adjustable.

German Utility Model 7 819 582 discloses a locking system for gate valves having a rising spindle wherein, since the lift is considerably greater than with a screwdown valve, a coaxial cylindrical sleeve is rigidly secured to the handwheel and the spindle extending therethrough is correspondingly elongated. Locking elements are secured in a desired number to the sleeve and lock bolts are engageable in a groove or recess formed in the elongated spindle.

A locking system of this kind is also known for short-movement screwdown valves having a rising valve spindle wherein a cylindrical lock member comprises a cylinder and a radially-extending lock bolt. The lock member is connected to the end face of the spindle which extends through the handwheel and is devised such that a cooperating recess in the handwheel extends all or some of the way around the lock member. When in the locking position, the lock bolt engages a groove in the handwheel recess or is disposed, when locking the valve spindle in the top end position, above the top edge of the handwheel. The usual practice for locks of this kind is to use cylinder locks whose key can be withdrawn only when the lock is in a desired locking position.

One of the unsatisfactory features of known locking systems is that the locking positions are preset and cannot be readjusted without considerable work. For instance, the lock of a valve which is lockable in the open position cannot be readily adjusted for locking thereof in the closed position or vice versa. Other disadvantages of prior locks arise because of the design limitations of the known locking systems of this kind. More particularly, due to the accumulation of manufacturing tolerances in long-production runs, considerable difference may arise between the actual locking position and the desired locking position of the present lock arrangements.

SUMMARY OF THE INVENTION

The present invention overcomes the above and other shortcomings of prior-art valve locks and other similar locks by means of a simple and very compact adjustable lock for rotating drives, more particularly for pipework fittings such as screwdown valves, gate valves or the like, such as are found in power stations and chemical plants. The lock of this invention is very reliable in respect of prevention of unauthorized use, yet is readily adjustable on-site to different lock settings according to the different operating conditions encountered in use. For instance, in a stop valve the locking position is adjustable to correspond to the closed position, the open position or any of numerous intermediate positions.

In a preferred embodiment of the invention, a locking flange includes an annular flange having a plurality of peripherally-consecutive, radial lock bolt receiving recesses which are open to at least one axial side of the flange. The sleeve is constrained to rotate only in conjunction with opening or closing of the valve with which it is associated. Two axially-adjacent, internally-toothed rings encompass the locking sleeve axially adjacent to the one axial side of the annular flange. One of the rings (the guide ring) is stationary in operation but also readily adjustable whereas the other ring (the control ring) is rotatable in operation.

The internal teeth of the guide ring and control ring are engaged by a common pinion which is rotatably mounted on the locking sleeve and which cooperates with the guide ring and control ring to form a planetary transmission. The number of internal teeth on the control ring differs from the number on the guide ring by one or two, such that as the locking sleeve rotates with respect to the stationary guide ring, the control ring rotates also.

The control ring has formed on its external periphery a single recess (control recess) which is open on the annular face adjacent the one axial end of the annular flange such that when disposed in registry with one of the locking recesses in the annular flange and in alignment with the lock bolt, a bolt-receiving recess is formed such that the lock bolt can be introduced positively in the radial direction to lock the ring and sleeve arrangement against rotation.

The guide ring also has external teeth which are engageable by an adjustable locking device which is operable as by a removable key to selectively adjust the position of the guide ring and thereby adjust the position in which the valve may be locked.

Through the agency of the above-mentioned planetary reduction transmission, the control ring rotates through less than one revolution for adjustment of the lock device from one extreme end position of the valve spindle to the other. The main advantage of a planetary transmission is that its parts are few in number and of simple construction. Also, since it is arranged concentrically of the locking sleeve, it takes up little space and thus enables the complete locking system construction to be compact.

According to another advantageous feature of the invention, the lock housing includes an inspection window through which parts of the guide ring, control ring and sleeve flange are visible, as well as suitable position-indicating markings to facilitate valve lock adjustment and operation. In accordance with another feature of the invention, if the operative movement of a device, e.g., the number of revolutions required to move the valve disc from one extreme end position to the other, is so great that the number of control ring teeth necessary to step down the number of revolutions of the screw-threaded collar to less than one revolution of the control ring cannot be provided on a single ring, then two axially-adjacent control rings having different tooth numbers from one another and from the guide ring can be associated with a single guide ring. If the difference in tooth number is one tooth in each case, a particular locking position is returned to only after the number of sleeve revolutions corresponding to the lowest common multiple of the tooth numbers of the two control rings.

Another advantage of the invention is that it is a simple matter to multiply the locking capability so that, for instance, a device is rendered lockable in three different positions independently of one another by providing three axially-adjacent independent locking systems on a single locking sleeve each comprising guide and control rings engaged by a pinion carried by the single locking sleeve, and three corresponding lock bolts each at a circumferential offset of 90°, and with an associated cylinder lock and the respective elements, such as recesses, locking means, and so forth, being provided. This system enables a stop valve to be locked in three positions, for instance, in the closed position, in the open position and in a selectable intermediate position, without any requirement for repeated adjustment of the locking device. The invention will be more readily understood upon consideration of the following detailed description and the accompanying drawings, in which:

Figure 1:
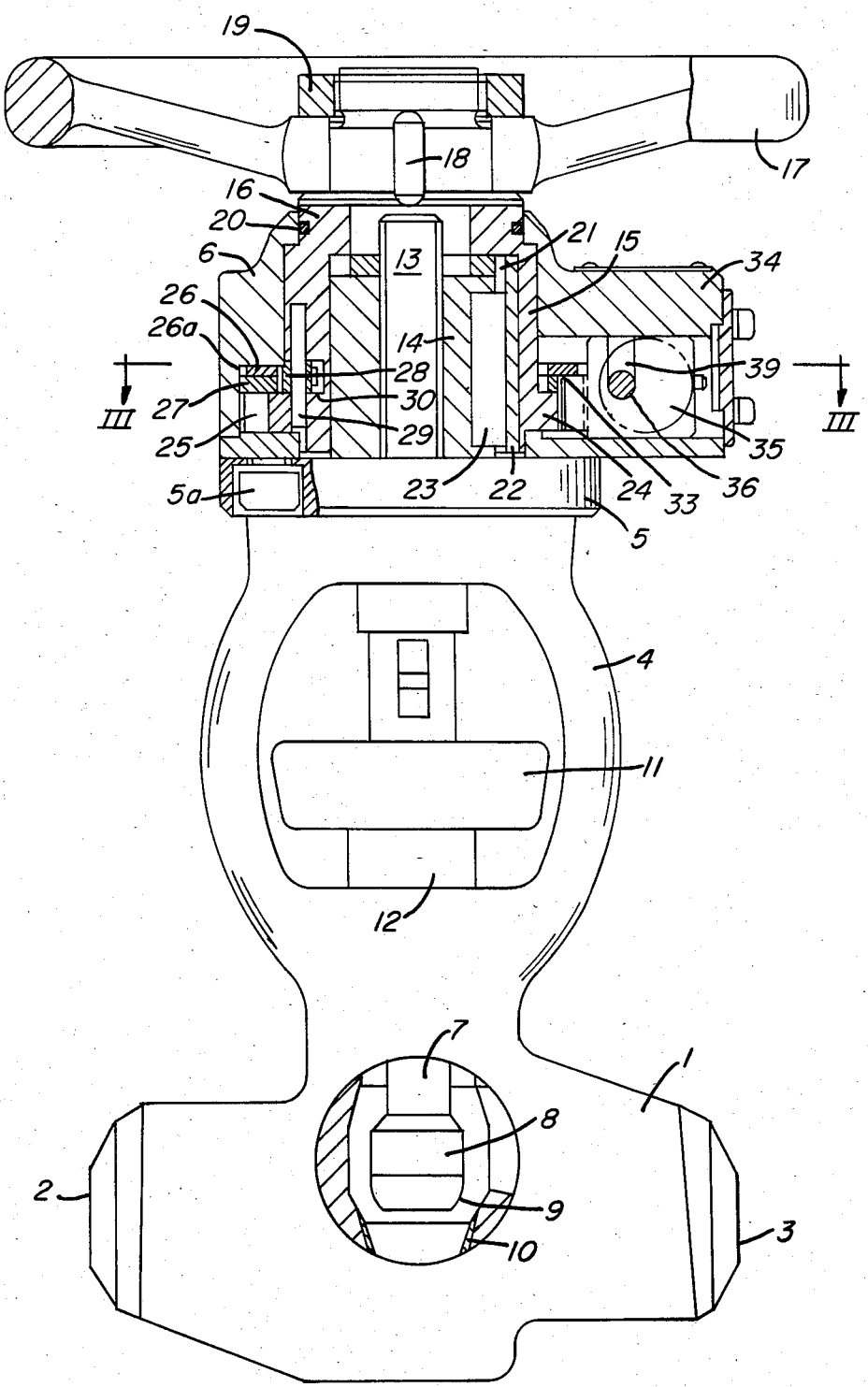
FIG. 1 is a side elevation of a screwdown valve having a locking system according to the invention and partially sectioned on I—I of FIG. 3.

In the drawings, there is shown a valve body 1 having an inlet port 2, an associated outlet port 3, an integral double yoke 4 and a casing portion 6 which is secured by screws 5a to a yoke bushing portion 5 of the yoke 4. An inner end of an elongated valve spindle 7 includes a associated disc 8 with a face 9 that is engageable with a valve seat 10 of the body 1 when the valve is closed, as is well known. A gland 11 is secured to a neck portion 12 of the body 1, through which spindle 7 extends, by conventional clamping screws (not shown). When tightened, the clamping screws compress the gland packing inside body neck 12.

Spindle 7 has an external screw thread extending on an outer end portion 13 thereof and is guided by a cooperating screw thread within an internally-threaded collar 14 that is so retained in the valve control head as to be rotatable but axially immobile. A locking sleeve 15 coaxially encompasses collar 14 and merges upwardly into a hollow cylindrical portion 16. A valve-operating handwheel 17 is mounted on cylindrical portion 16 as by means of an eccentric dowel 18 so as to be operatively connected to sleeve 15 for rotation thereof. A profiled nut 19 is screwed onto a projecting, externally screw threaded end of cylindrical portion 16 to secure the handwheel 17 thereto. The sleeve 15 is retained in the casing 6 so as to be rotatable but axially immobile therein. An O-ring 20 seals the circumferential interface between the rotary sleeve 15 and the stationary casing 6.

Figure 3:
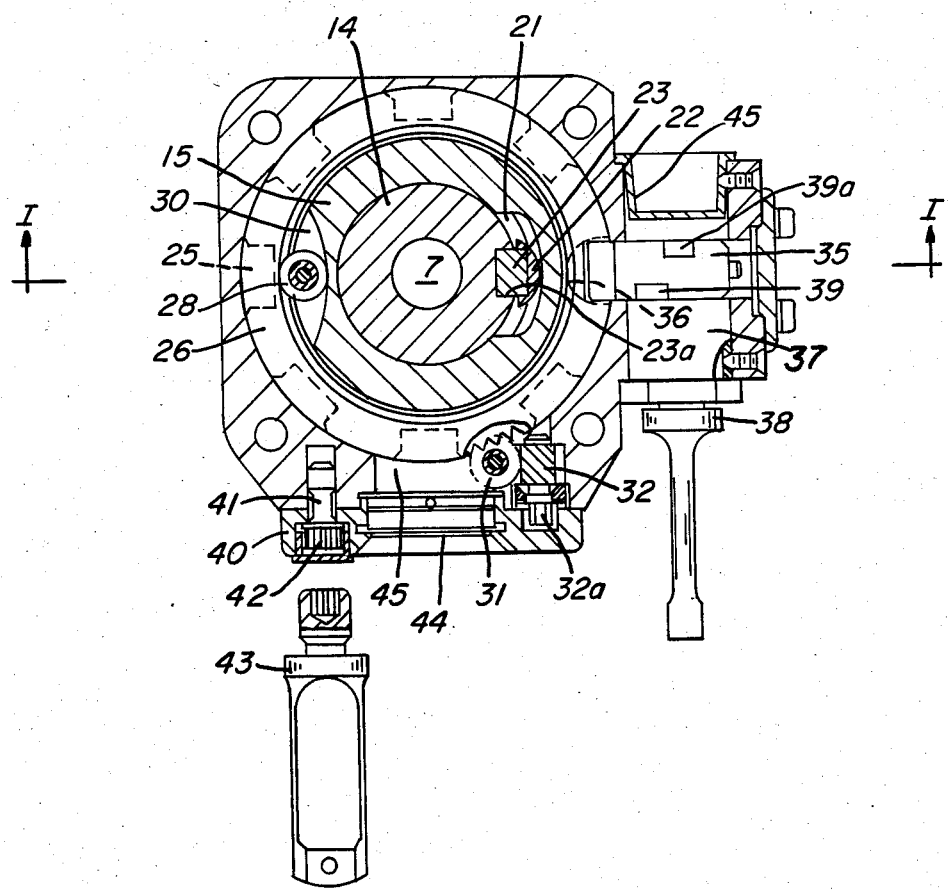
FIG. 3 is a transverse section taken on line III—III of FIG. 1.

Collar 14 and sleeve 15 have provision for limited relative movement therebetween for reasons to be explained hereinbelow. As can be seen in FIG. 3, sleeve 15 includes an axially-extending internal recess 21 in which an elongated slide block 22 is guided for movement between the circumferential ends of the recess 21. The slide block engages a key block 23 which is retained in an axially-extending external groove 23a formed in the collar 14. When the handwheel 17 is turned, the collar 14 is rotated therewith by sleeve 15 only when the slide block 22 abuts the corresponding circumferential end of the recess 21. Accordingly, a limited lost motion or freeplay is provided.

An annular flange 24 of sleeve 15 projects radially outward of the lower end of the sleeve 15 and is formed with a plurality of circumferentially-spaced, radially-outwardly opening locking recesses 25 which are open on both annular end faces of flange 24. Two axially-adjacent, internally-toothed rings, namely a guide ring 26 and a control ring 27, encompass sleeve 15 adjacent flange 24. The internal toothing of the control ring 27 has one tooth less or one tooth more than the internal toothing of the guide ring 26, and the internal teeth of both rings 26 and 27 are engaged by a pinion 28 which is rotatably mounted on a spindle 29 carried by sleeve 15. As shown in FIG. 3, the wall of sleeve 15 is provided with a recess 30 to receive the pinion 28.

The guide ring 26 is maintained stationary once a locking configuration has been set but can be readily adjusted to alter the locking configuration. To this end, guide ring 26 has external toothing 26a which is engaged by a pinion 31 that is operatively connected to a worm 32 and both of which are rotatably mounted in the casing 6. The outwardly-extending end 32a of the worm shaft includes a profiled drive end which is engageable by a suitable key 43 for turning the worm 32 and thereby rotating the guide ring 26. The transmission formed by the pinion 31 and worm 32 is self-locking and, therefore, provides firm retention of the guide ring 26 in any selected rotary position thereof.

The control ring 27 has formed at a selected point on its outer periphery a control recess 33 which has a circumferential extent corresponding to the locking recesses 25 in the annular flange 24. In FIG. 3, control recess 33 is not apparent as it is aligned with a recess 25 to receive the lock bolt 35.

The radially-movable lock bolt 35 is mounted in a laterally-projecting portion 34 of the casing 6. The lock bolt 35 is movable by a peg 36 of a conventional cylinder lock 37 that is disposed in the casing portion 34, and is conventionally actuated by a removable key 38. When the cylinder of lock 37 is rotated, peg 36, which is guided positively in a groove 39 in the lock bolt 35, moves through a quadrant to produce a corresponding rectilinear movement of the lock bolt 35.

FIGS. 1 and 3 show lock bolts 35 in the locking position in which its radially inner end engages a locking recess 25 and the registered control recess 33 above it in the control ring 27. In this position, the lock bolt 35 secures sleeve 15 and, therefore, prevents rotation of handwheel 17. Operation of the valve thus is precluded.

When the valve is unlocked by operation of lock 37 to withdraw bolt 35, the valve may be operated normally. During such operation, sleeve 15 rotates concomitantly with handwheel 17, and pinion 28 rotates simultaneously in the internal tooth systems of the rings 26, 27. Since the guide ring 26 is maintained stationary by pinion 31 and worm 32, and has a different number of teeth than control ring 27, the control ring 27 rotates relatively to the stationary guide ring 26 according to the difference in tooth number. For example, if the guide ring 26 has fifty teeth and the control ring only forty-nine teeth, the locking sleeve 15 must make fifty revolutions before the control ring 27 makes one revolution and returns to its initial position. Consequently, the control recess 33 in the periphery of the control ring 27 returns to its operative position, i.e., the position in which lock bolt 35 can be reengaged therein, only after fifty revolutions of handwheel 17. A reduction drive of this kind is appropriate, for example, in rotating drives wherein the maximum number of revolutions of the drive is forty-nine or less.

The casing 6 has on one side thereof a removable cover 40 which covers the profiled worm shaft end part 32a and which is secured by screws 41 to the casing 6. Heads 42 of the screws 41 are of a special shape and are also received in a recess in the cover 40 and can, therefore, be operated only by an adjusting key 43 adapted to their special shape. Consequently, the cover 40 can be removed only by persons authorized to alter the adjustment of the lock and possessing the special key 43, while the lock itself can be operated by anyone possessing key 38.

Disposed in the cover 40 is an inspection window 44 through which portions of the periphery of the guide ring 26, control ring 27 and ring flange 24 are visible. To this end, the wall of the casing 6 is formed with an aperture 45 behind the window 44. The locking recesses 25 in the annular flange 24 can be seen one at a time through the window 44. Window 44 is located with respect to lock bolt 35 such that when a recess 25 is centrally positioned in window 44, another recess 25 is positioned to receive lock bolt 35.

Figure 2:
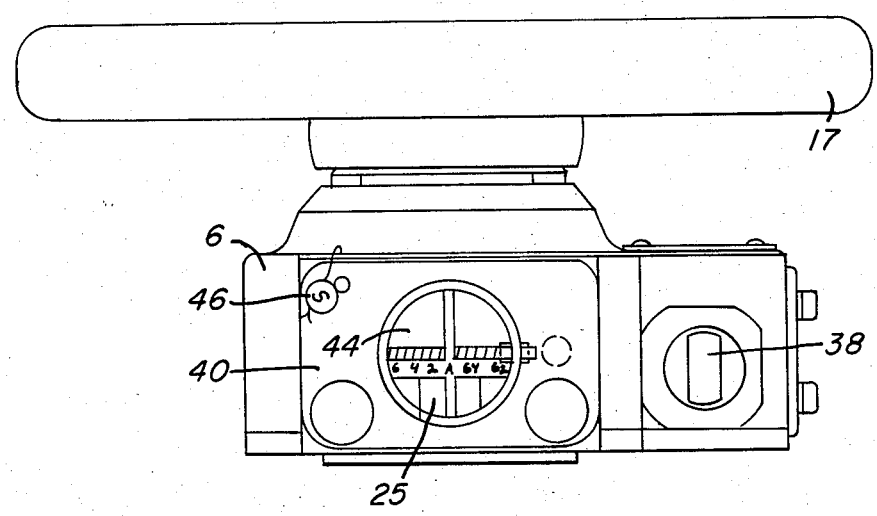
FIG. 2 is a fragmentary side elevation of the locking system.

Similarly, the locking position on rotating control ring 27 is marked with the letter A. When the letter A takes up a central position as shown in FIG. 2, control ring 27 is positioned such that the inner end of lock bolt 35 can engage control ring recess 33. The numbers to either side of the letter A on ring 27 denote the number of revolutions which the sleeve 15 has made since leaving the locking position, A. For instance, the appearance of number 4 behind the center line of the window 44 indicates that sleeve 15 is four revolutions from the locking position.

Operation of the lock is now described with reference to the following scenario.

It will be assumed that the valve is locked in its closed position and is to be opened.

The key 38 is used to move the lock bolt 35 from its locking position, shown in FIGS. 1 and 3, to its release position, to disengage flange 24 and ring 27 and thereby free sleeve 15. Rotation of the handwheel 17 acts by way of the corotating sleeve 15 to rotate the collar 14 and thus to move the spindle 7 which is threadedly engaged therewith, axially toward the open position.

To lock the valve, spindle 7 is returned to the closed position and handwheel 17 is then turned back or backed off until the letter A and one of the locking recesses 25 appear in the central position in window 44. In this latter turning-back, the backlash or freeplay associated with the slide block 22 permits adjustment of handwheel 17 to the predetermined locking position. The limited free rotary mobility of sleeve 15 with respect to collar 14 is such that the distance between adjacent locking recesses 25 is bridged. This turning-back thus does not alter the preset position of the collar 14 and, therefore, does not disturb the closed position of the valve.

For alteration of locking setting, for example, from the valve closed position to the valve open position, the unlocking operation proceeds as hereinbefore described and operating key 38 remains locked in cylinder lock 37. The handwheel 17 is turned to move valve spindle 7 into its open position. The screws 41 of cover 40 are slackened by means of key 43 and cover 40 is removed, after which the same key 43 can be engaged on the worm shaft end 32a and the worm 32 is turned thereby in order to rotate the guide ring 26. The corotating pinion 28 causes the control ring 27 to rotate also. With handwheel 17 positioned within the range of freeplay with respect to collar 14 to center one of recesses 25 in window 44, worm 32 is further rotated until the letter A on the periphery of the control ring 27 takes up a central position in window 44. The handwheel 17 and worm 32 may be turned slightly as required to align the locking recess 25 and the letter indicia A in the central position. Control recess 33 and a locking recess 25 will now be in registration with one another and positioned to receive the lock bolt 35. Upon the completion of adjustment, the cover 40 is screwed back on the casing 6. The valve can now be locked or unlocked in the open position in just the safe way as hereinbefore described for the closed position.

In the embodiment described, the locking mechanism casing 6 is adapted to receive two cylinder locks. The second cylinder lock may be introduced on that side of the lock bolt 35 which is remote from the first lock cylinder 37, after removal of a protective cap or cover as shown. For this amplification, the lock bolt 35 is provided with a groove 39a as necessary to accommodate operation thereof by the second cylinder lock. The use of two cylinder locks can be considered for sequential locking systems, the lock cylinders being such that one of the two operating keys cannot be withdrawn in the locked position while the other can be withdrawn and used for sequential purposes.

As an additional protection against tampering, the cover 40 can be secured by a seal 46 in the manner shown in FIG. 2.

It will be appreciated that in this locking, there is a direct operative engagement, without interposed parts, between the lock bolt and the locking sleeve and, therefore, the rotating drive. Mechanical stressing of the lock bolt, more particularly shear stressing, is less than in other known lockings wherein interposed elements step up the shearing forces. The lock bolt cannot jam in response to an attempt to misoperate it. Also, the direct transmission of forces increases the accuracy of adjustment of the locking by cutting out cumulative manufacturing errors.

As a rule, a number of spindle rotations are needed to adjust the disc of a screwdown valve between its two end positions. According to the invention, in order that this travel may be reduced to a single revolution of the control ring and, therefore, to a single clear locking position, the combined recess which receives the lock bolt is such that the lock bolt can engage positively therein at only one position of spindle 7. Preferably, as noted hereinabove, the number of revolutions of handwheel 17 required to provide a full revolution of the control ring is greater than the maximum number of available handwheel revolutions, whereby only a single, unique but readily adjustable locking position is available.

According to the description hereinabove, the present invention provides for a novel and improved adjustable lock for a rotary drive, especially for a rotary valve drive such as found in screwdown or gate valves. It will be apparent that various modified and alternative embodiments of the invention, not limited to the described preferred embodiments thereof, will occur to those skilled in the art. Accordingly, it is intended that the invention be construed broadly and limited only by the scope of the claims appended hereto.

I claim as my invention:

1. In An adjustable lock for rotating drives such as screwdown and gate valves wherein a casing for a locking mechanism extends around a driven rotating member of the drive, a locking sleeve corotates with the rotating member and its rotation is transmitted to a valve spindle or the like, and a lock bolt having a key-operable cylinder lock is movable between a locking position and a release position and adapted to locate the locking sleeve in a selected position, the improvement in said lock comprising:

an annular flange on the locking sleeve formed with peripherally-consecutive radial recesses which are open on at least one side of the flange, at least two axially-contiguous, internally-toothed rings mounted to surround the locking sleeve adjacent the annular flange, one such ring comprising a guide ring which is stationary but adjustable, the other such ring comprising a control ring which is rotatable and differs in tooth number from the guide ring by at least one tooth, a pinion engaging the internal tooth systems of the guide ring and control ring, the pinion being rotatable mounted on the locking sleeve and cooperating with the guide ring and control ring to form a planetary transmission, said control ring being formed on its periphery with a single recess which is open on an end face of the control ring which engages the annular flange and which, when in registration with a radial recess in the annular flange, forms part of a combined recess of an opening of cross section such that the lock bolt can be introduced positively thereinto in the peripheral direction, and outer toothing on the guide ring engageable by adjustable locking means for adjustment of the locking position of the lock.

2. A lock according to claim 1 further characterized in that the annular flange is integral with the locking sleeve.

3. A lock according to claim 2 further characterized in that the adjustable locking means takes the form of a pinion engaging the guide ring outer toothing and a worm which drives a pinion, the worm having a profiled end shaft engageable by an adjusting key.

4. A lock according to claim 3 further characterized in that the profiled end shaft of the worm is covered by a cover secured by screws to the locking mechanism casing.

5. A lock according to claim 1 further characterized in that relative movement is possible between the locking sleeve and the driven rotating member.

6. A lock according to claim 5 wherein a key block is provided to transmit torque from said driven rotating member to said locking sleeve, characterized in that a slide block which engages the key block is slideable within a recess on the locking sleeve so as to have provision for limited movement with respect thereto in the peripheral direction.

7. A lock according to claim 4 futher characterized in that the cover has an inspection window through which parts of the periphery of the guide ring, control ring and annular flange are visible, the control ring periphery having position-indicating markings thereon.

* * * * *